Oct. 31, 1933.  A. ANDERSON  1,932,949
CUTTER CHAIN FOR COAL CUTTING MACHINES
Filed March 20, 1933  3 Sheets-Sheet 1

Oct. 31, 1933.  A. ANDERSON  1,932,949
CUTTER CHAIN FOR COAL CUTTING MACHINES
Filed March 20, 1933  3 Sheets-Sheet 2
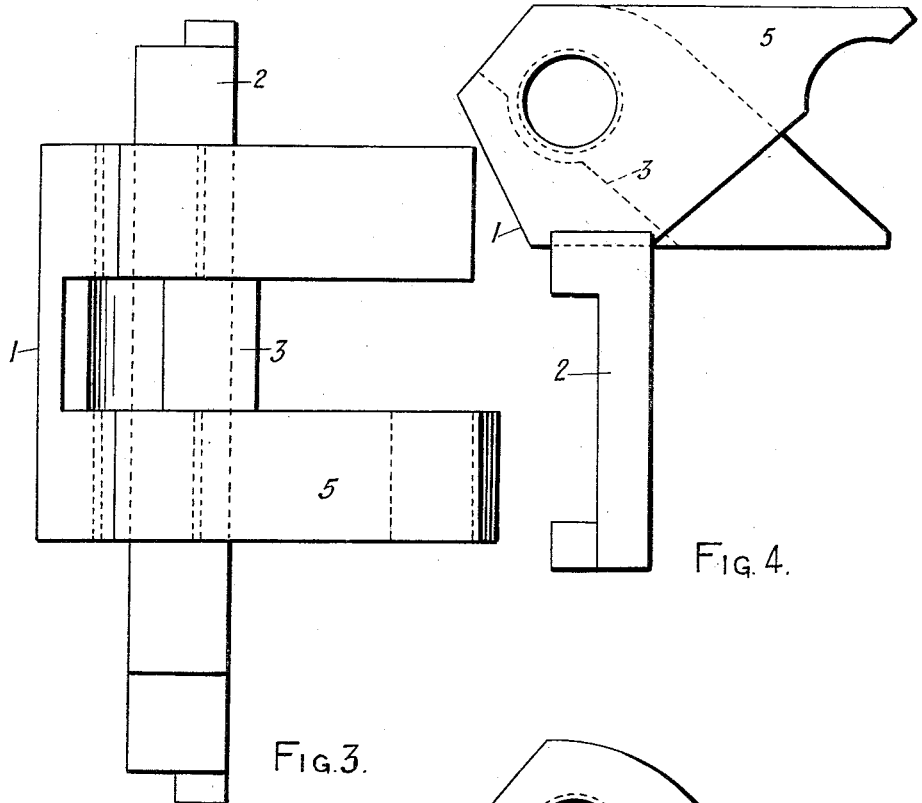
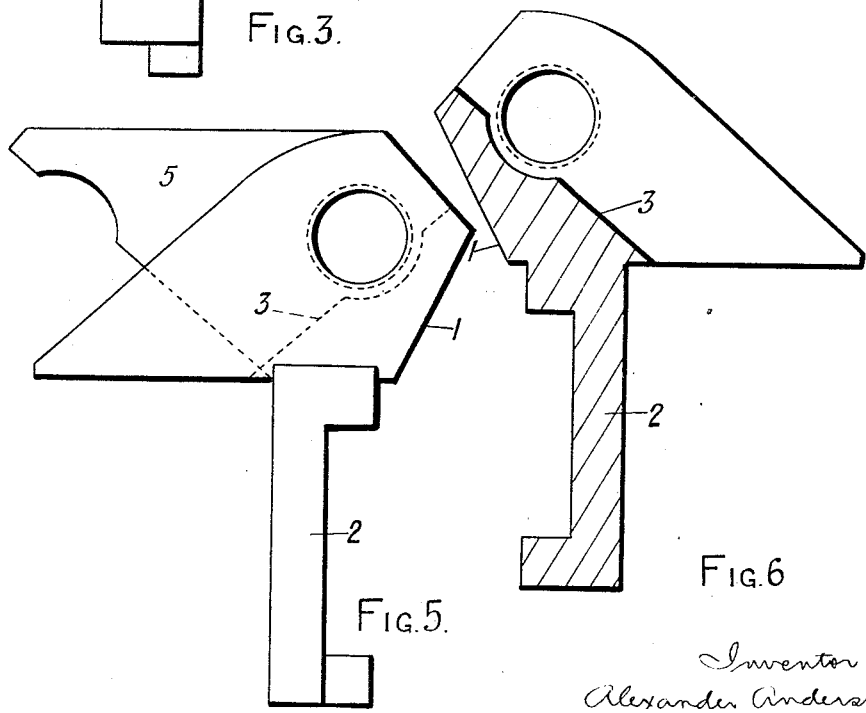

Oct. 31, 1933.        A. ANDERSON        1,932,949
CUTTER CHAIN FOR COAL CUTTING MACHINES
Filed March 20, 1933        3 Sheets-Sheet 3

Inventor
Alexander Anderson
By
Pennie, Davis, Marvin & Edmonds
Attorneys

Patented Oct. 31, 1933

1,932,949

UNITED STATES PATENT OFFICE 1,932,949

CUTTER CHAIN FOR COAL-CUTTING MACHINES

Alexander Anderson, Motherwell, Scotland, assignor to Anderson, Boyes & Company Limited, Motherwell, Scotland, a company of Great Britain Application March 20, 1933, Serial No. 661,659, and in Great Britain February 3, 1933

1 Claim. (Cl. 262—33)

This invention relates to cutter chains for coal-cutting machines of the type in which each pick-carrying block comprises side plates united by a bridge portion which is formed with pick-receiving sockets so as to function as a pick-box.

In the specification of my co-pending patent application No. 661,657 there is described a pick-carrying block comprising a bridge member integral with a side plate and formed by a machining operation such as a milling or equivalent operation with a notch which affords the inner wall of a pick-receiving socket of non-circular cross-section, an associated side plate formed with an integral horn accommodated in the notch so as to fill the open side of the notch and to constitute the outer wall of the pick-receiving socket, and welds uniting the associated side plate with the bridge member which extend along the adjoining outer edges of the bridge member and the side plate incorporating the horn and along the outer boundaries of the notch and the adjoining edges of the horn.

The invention provides a pick-carrying block comprising a bridge member composed of two sections of which the first section is integral with one side plate and of which the second section is integral with the other side plate, each section being formed by a machining operation such as a milling or equivalent operation with a notch which affords the inner wall of a pick-receiving socket of non-circular cross-section and each section being formed with an integral horn adapted to fill the open side of the corresponding notch in the complemental section so as to constitute the outer wall of the relative pick-receiving socket, and welds uniting the sections which extend along the sides of both horns and the junctions of the bridge members with the complemental side plates.

Figure 1:
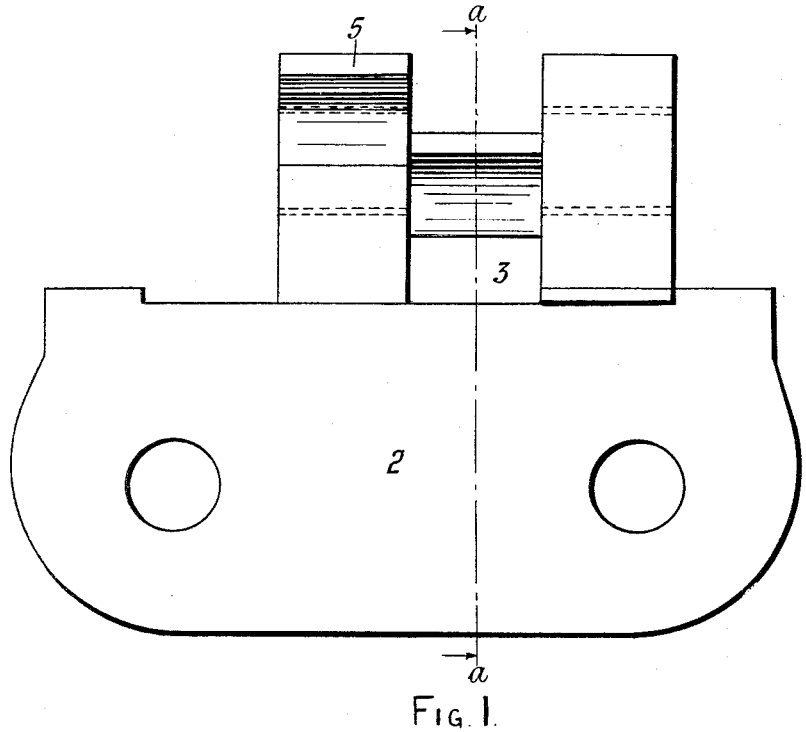
Figure 2:
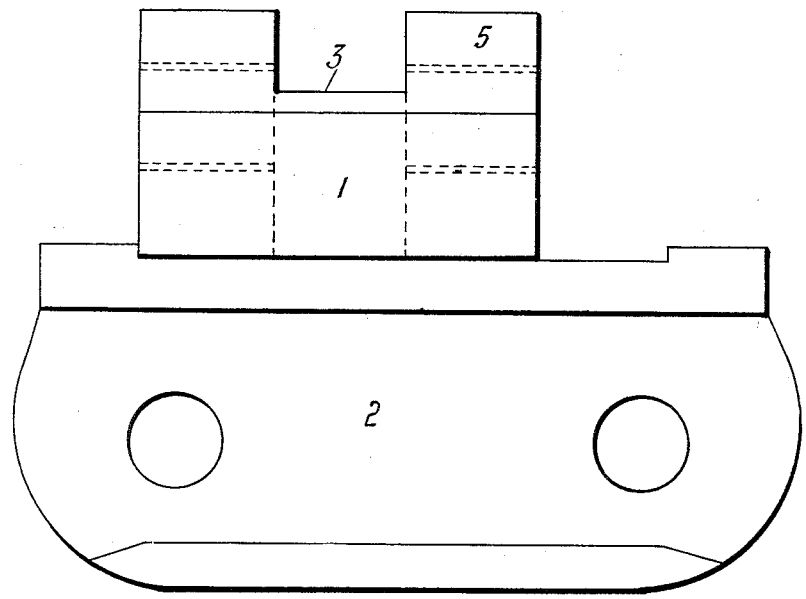
Figures 7, 9:
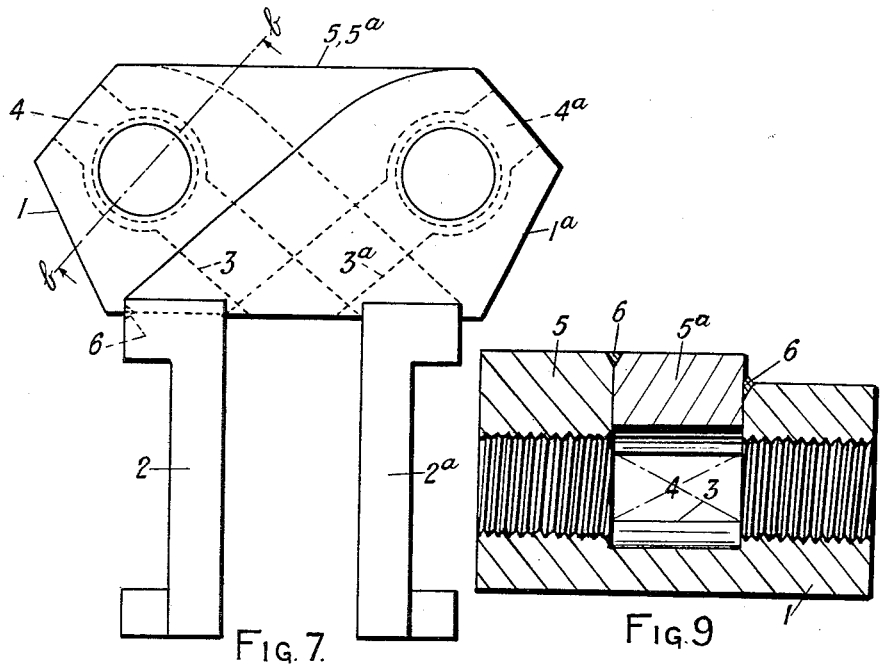
Figure 8:
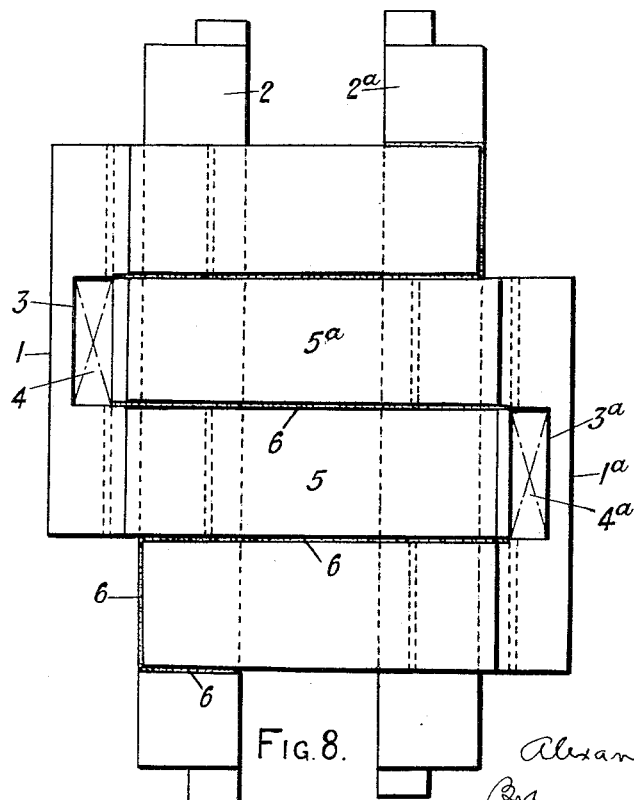

The invention is illustrated in the accompanying drawings in which Figs. 1–6 are detail views showing one side plate constituting one half of the pick-carrying block, Figs. 1 and 2 being side elevations at 180° to one another, Fig. 3 a plan view, Figs. 4 and 5 end elevations from opposite ends, and Fig. 6 a vertical transverse section on the line $a$—$a$ of Fig. 1; Fig. 7 is an end elevation and Fig. 8 a plan view showing two side plates assembled to form the complete pick-carrying block, and Fig. 9 is a fragmentary detail section on the line $b$—$b$ of Fig. 7.

The pick-carrying block shown comprises a bridge member composed of two section 1, $1^a$ of which the section 1 is integral with one side plate 2 and of which the section $1^a$ is integral with the other side plate $2^a$. Each section is formed by a machining operation such as a milling or equivalent operation with a notch 3 or $3^a$ which affords the inner wall of a pick-receiving socket 4 or $4^a$ of non-circular cross section. Each section is formed with an integral horn 5 or $5^a$ adapted to fill the open side of the corresponding notch 3 or $3^a$ in the complemental section so as to constitute the outer wall of the pick-receiving socket 4 or $4^a$. The sections 1, $1^a$ are united by welds 6 which extend along the sides of both horns 5, $5^a$ and the junctions of the bridge members 1, $1^a$ with the complemental side plates 2, $2^a$.

I claim:

A pick-carrying block of the type referred to comprising, in combination, a bridge member composed of two sections of which the first section is integral with one side plate and of which the second section is integral with the other side plate, each of said sections being formed by a machining operation such as a milling or equivalent operation with a notch which affords the inner wall of a pick-receiving socket of non-circular cross section and each section being formed with an integral horn adapted to fill the open side of the notch in the complemental section so as to constitute the outer wall of the relative pick-receiving socket, and welds uniting the sections which extend along the sides of both of said horns and the junctions of said bridge members with the complemental side plates.

ALEX. ANDERSON.